United States Patent [19]
Wiebelhaus et al.

[11] Patent Number: 5,360,087
[45] Date of Patent: Nov. 1, 1994

[54] ASSEMBLED BRAKE DISC FOR A DISC BRAKE WITH PARTIAL LINING

[75] Inventors: Wolfgang Wiebelhaus, Mulheim an der Ruhr; Manfred Gronemann; Wolfgang Lehmann, both of Remscheid; Jürgen Schneider, Bochum; Hans Rocholl, Remscheid, all of Germany

[73] Assignee: Bergische Stahl-Industrie, Remscheid, Germany

[21] Appl. No.: 845,917

[22] Filed: Mar. 4, 1992

[30] Foreign Application Priority Data

Mar. 4, 1991 [DE] Germany .............................. 4106808

[51] Int. Cl.⁵ .............................................. F16D 65/12
[52] U.S. Cl. ........................... 188/218 XL; 192/70.16
[58] Field of Search ............ 188/218 R, 218 XL, 73.2, 188/73.1; 192/70.16 X

[56] References Cited

U.S. PATENT DOCUMENTS

| | | | |
|---|---|---|---|
| 2,412,432 | 12/1946 | Tack | 188/218 XL |
| 3,685,623 | 8/1972 | Bradshaw | 188/218 XL X |
| 4,147,240 | 4/1979 | Klein et al. | 188/218 XL |
| 4,281,745 | 8/1981 | Wirth | 188/218 XL |
| 4,821,848 | 4/1989 | Izumine | 192/70.16 X |
| 4,989,708 | 2/1991 | Gaggermeier | 192/70.16 X |

FOREIGN PATENT DOCUMENTS

2150263  6/1985  United Kingdom ......... 188/218 XL

Primary Examiner—Robert J. Oberleitner
Assistant Examiner—Peter M. Poon
Attorney, Agent, or Firm—Robert W. Becker & Associates

[57] ABSTRACT

An assembled brake disc for a disc brake with partial lining is comprised of two components in the form of a brake ring and a hub and at least one dog and at least one corresponding groove. The components are connected to one another by the dog extending into the groove. The dog has outer contact surfaces resting at mating inner side walls of the groove. At least one of the outer contact surfaces and a corresponding one of the mating inner side walls are slanted relative to an axial direction of the brake disc. The brake disc further comprises screws extending parallel to the axial direction for pressing the outer contact surfaces against the mating inner side walls.

4 Claims, 5 Drawing Sheets

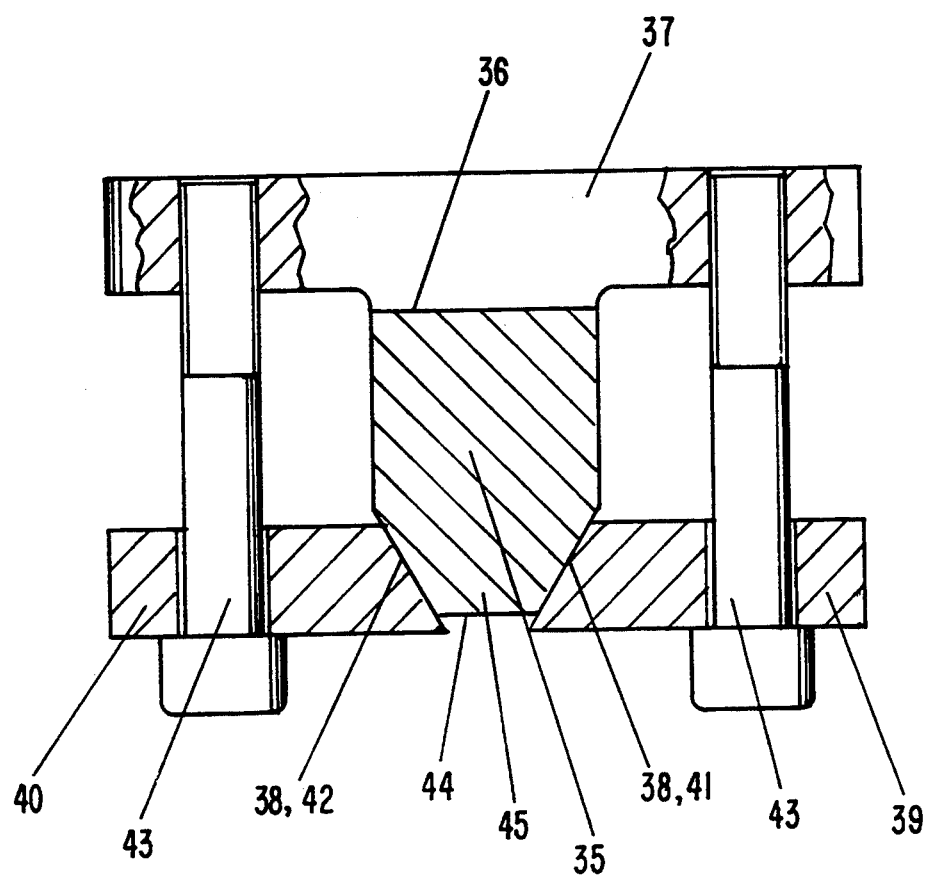
FIG—3

ASSEMBLED BRAKE DISC FOR A DISC BRAKE WITH PARTIAL LINING

BACKGROUND OF THE INVENTION

The present invention relates to an assembled brake disc for a disc brake with partial lining in which the connection between the brake ring and the hub is accomplished via a dog connected to one part and extending into a groove provided at the respective opposite part of the brake disc and whereby the dog rests at radial groove side walls extending essentially parallel to the axial direction of the brake disc.

It is known from German Offenlegungschrift 24 26 952, especially FIGS. 4 and 5, to provide a wedge-shaped bar which is inserted simultaneously into a groove at the brake disc and into a corresponding groove at the hub. In identical grooves two of the bars are fastened two of the bars with screws such that the brake disc connected to the hub. The disadvantage of this construction is that the expenditure during the manufacture of the two grooves in the two components brake ring and hub is considerable since otherwise one or the other side wall of the groove, respectively, contact surface of the wedge will not rest at the corresponding surface of the other part which, in return, results in a great surface pressure of the contacting surface areas causing great wear.

It is therefore an object of the present invention to avoid the disadvantages of the known construction and to provide a design for the dog and the groove such that a tight connection between the dog of one part and the groove of the other part results for all desired connections of a brake disc and furthermore to prevent out-of-trueness of the brake ring after assembly.

BRIEF DESCRIPTION OF THE DRAWINGS

This object, and other objects and advantages of the present invention, will appear more clearly from the following specification in conjunction with the accompanying drawings, in which:

FIG. 3 is a cross-sectional view along the line II—III of FIG. 4; and

SUMMARY OF THE INVENTION

The assembled brake disc for a disc brake with partial lining according to the present invention is primarily characterized by the brake disc comprising two components in the form of a brake ring and a hub and at least one dog and at least one corresponding groove, the components being connected to one another by the dog extending into the groove, the dog having outer contact surfaces resting at mating inner side walls of the groove, with at least one of the outer contact surfaces and a corresponding one of the mating inner side walls being slanted relative to an axial direction of the brake disc, and further comprising screws extending parallel to the axial direction for pressing the outer contact surfaces against the mating inner side walls.

In a preferred embodiment the dog is comprised of a main body and an additional wedge-shaped part, whereby the additional wedge-shaped part has the slanted outer contact surface, and whereby the brake disc further comprises a pressure spring for pressing the additional wedge-shaped part between the main body and the mating inner side walls of the groove.

It is advantageous that the hub is provided with radially extending arms and the groove is in the form of a recess provided between the arms, whereby the mating inner side walls are slanted, and whereby the arms are connected to the brake ring with the aforementioned screws.

It is furthermore possible to provide the brake ring at a backside thereof with projections forming therebetween a recessed portion for receiving the dog, whereby the dog rests in the recess of the arms and in the recessed portion between the projections of the brake ring.

In another embodiment, the brake disc further comprises concentric annular segments, with the groove being formed between adjacent ones of the segments, whereby the segments have at free ends thereof slanted faces forming the mating inner wall surface of the groove. The dog has a flat bottom portion resting on the hub and a trapeze-shaped top portion, with slanted sides of the trapeze-shaped top portion forming the outer contact surfaces and resting at the slanted faces of the segments.

The advantage of the inventive embodiments of the connecting parts in the form of a dog and a groove for fixedly connecting a brake ring to a hub is that exterior forces acting on the brake ring may be transmitted in a simple manner without any disadvantageous effects from the brake ring to the hub.

DESCRIPTION OF PREFERRED EMBODIMENTS

The present invention will now be described in detail with the aid of several specific embodiments utilizing FIGS. 1 through 4.

Figure 1:
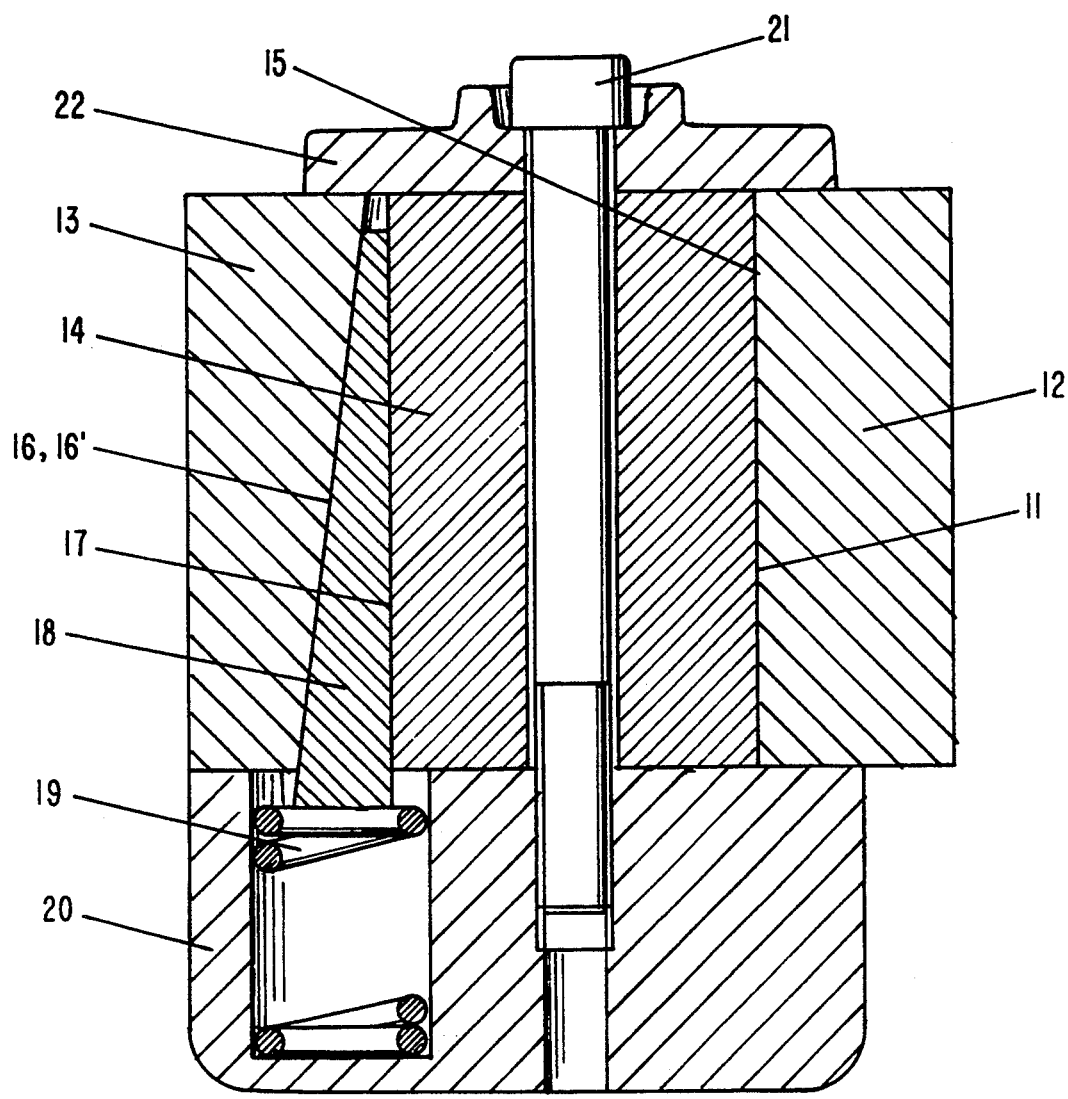
FIG. 1 is a concentric cross-sectional view through a connection between the hub and the brake rings.

FIG. 1 shows a radial groove 11 which is formed between arms 12 and 13 of a hub and a dog comprising a main part 14 and an additional wedge-shaped part 18 (wedge) connected to a brake ring. The outer contact surface 15 of the main part 14 extends radially and parallel to the axial direction of the brake ring. On the opposite side of the main part 14, the mating inner side wall 16' of the arm 13 is slanted. Between the contact 17 of the main part 14 which extends essentially parallel to the axial direction and the slanted mating inner side wall surface 16' of the arm 13 the wedge 18 with an outer contact surface 16 is forced against the mating inner side wall 16' and the contact surface 17 of the main part 14 by the pressure spring 19 as long as sufficient space is provided for this action. The abutment 20 for the spring 19 is held in place by a screw 21 which extends through the main part 14 and is essentially parallel to the axial direction. The screw 21 also fastens a securing element 22 at the opposite end of the main part 14 which covers the entire groove 11. The abutment 20 is big enough to cover the entire groove 11 and also acts as a securing means. Of course, it is also possible to provide two wedges 18 on either side of the main part 14. The pressure spring 19 forces the wedge 18 between the mating inner side wall 16' of the groove 11 and the contact surface 17 of the main part 14 to such an extent that the main part 14 is fixedly held within the groove 11. When due to wear the full contact of the mating inner side wall 16', the outer contact surface 16 and the contact surfaces 17 and 15 is no longer provided the wedge 18 is automatically forced by the spring 19 between the main part 14 and the arm 13 so that the main part 14 is again fixedly anchored within the groove 11.

Figure 2A:
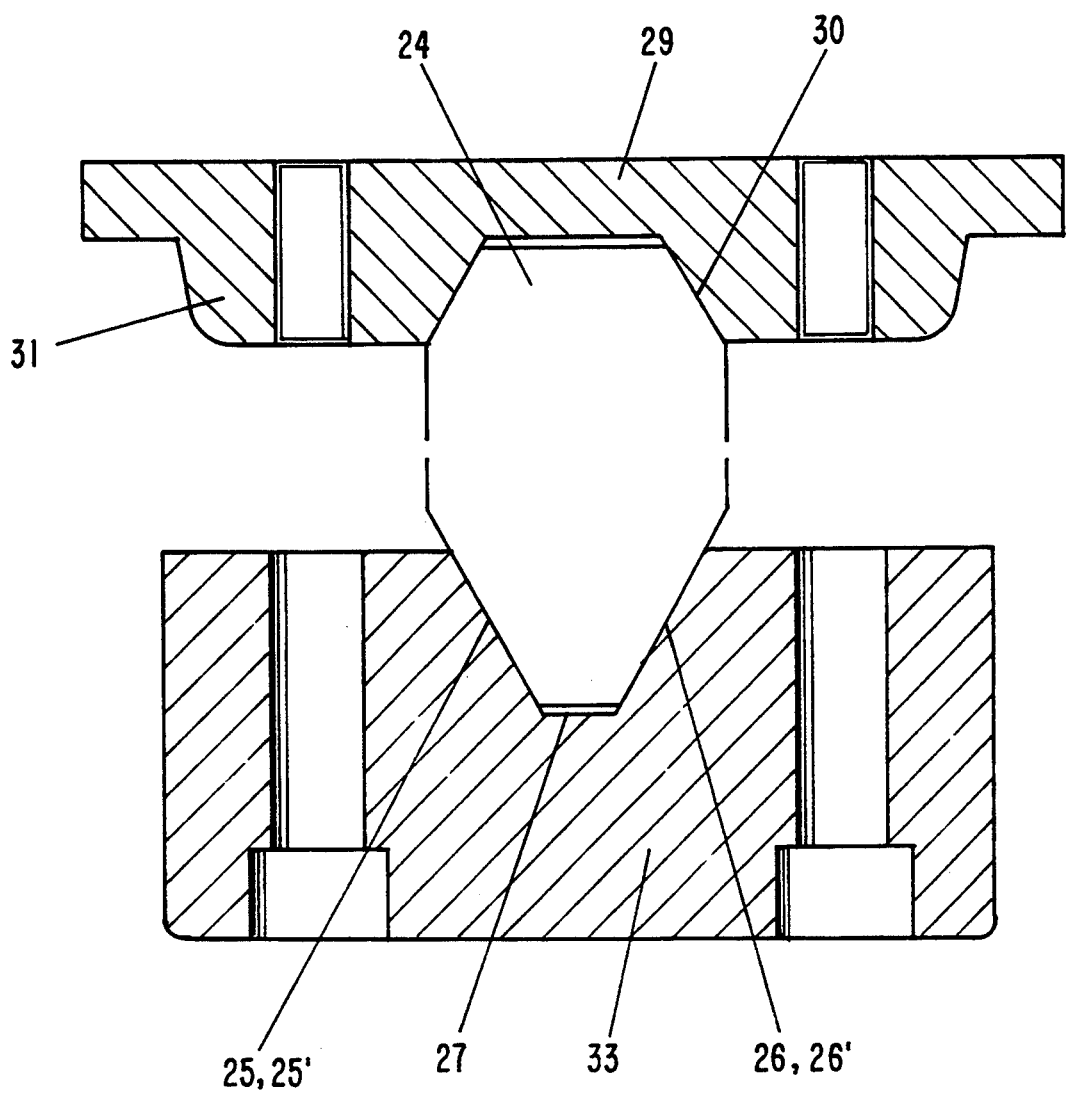
FIG. 2A shows a concentric cross-sectional view along the line II—II of FIG. 2B.
Figure 2B:
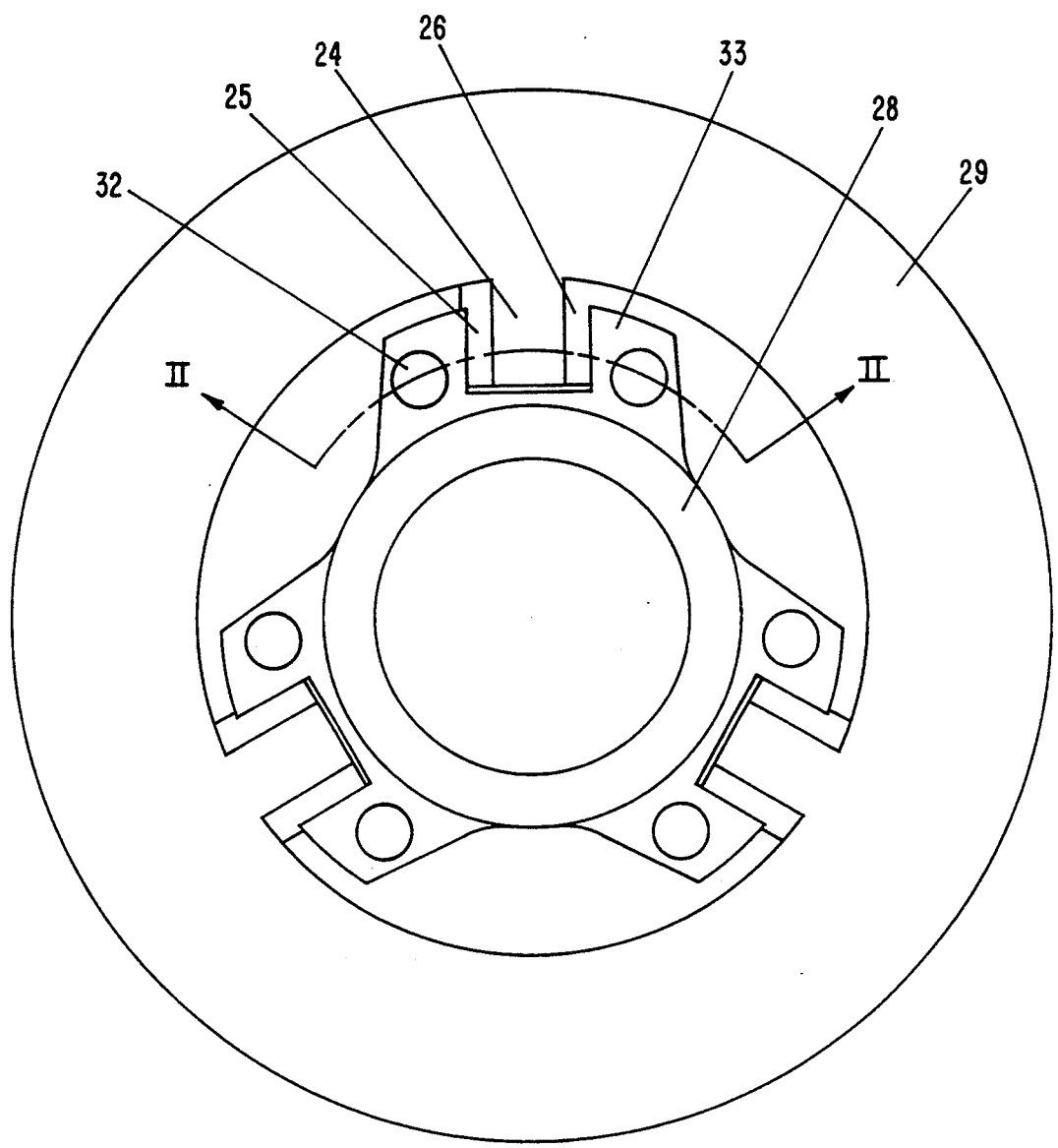
FIG. 2B is a side view of a connection between the brake ring and the hub.

According to the FIGS. 2A and 2B the dog 24 is a separate, radially extending part and is provided with two radially extending slanted outer contact surfaces 25 and 26. The hub 28 is provided with a recess 27 having mating inner side walls 26', 26'. The end of the dog 24 which is facing the brake ring 29 rests with further slanted surfaces 30 in a recessed portion provided between projections 31 of the back side of the brake ring 29. The brake ring 29 and the hub are connected to one another by two screws 32 which are arranged on either side of the recess 27 and which extend essentially parallel to the axial direction. The screws 32 extend into the brake ring 29. Due to the slanted outer contact surfaces 25, 26, the brake ring 29 is fixedly connected to the arms 33 of the hub. Occurring manufacturing tolerances may be compensated by the play of the screws 32.

Figure 4:
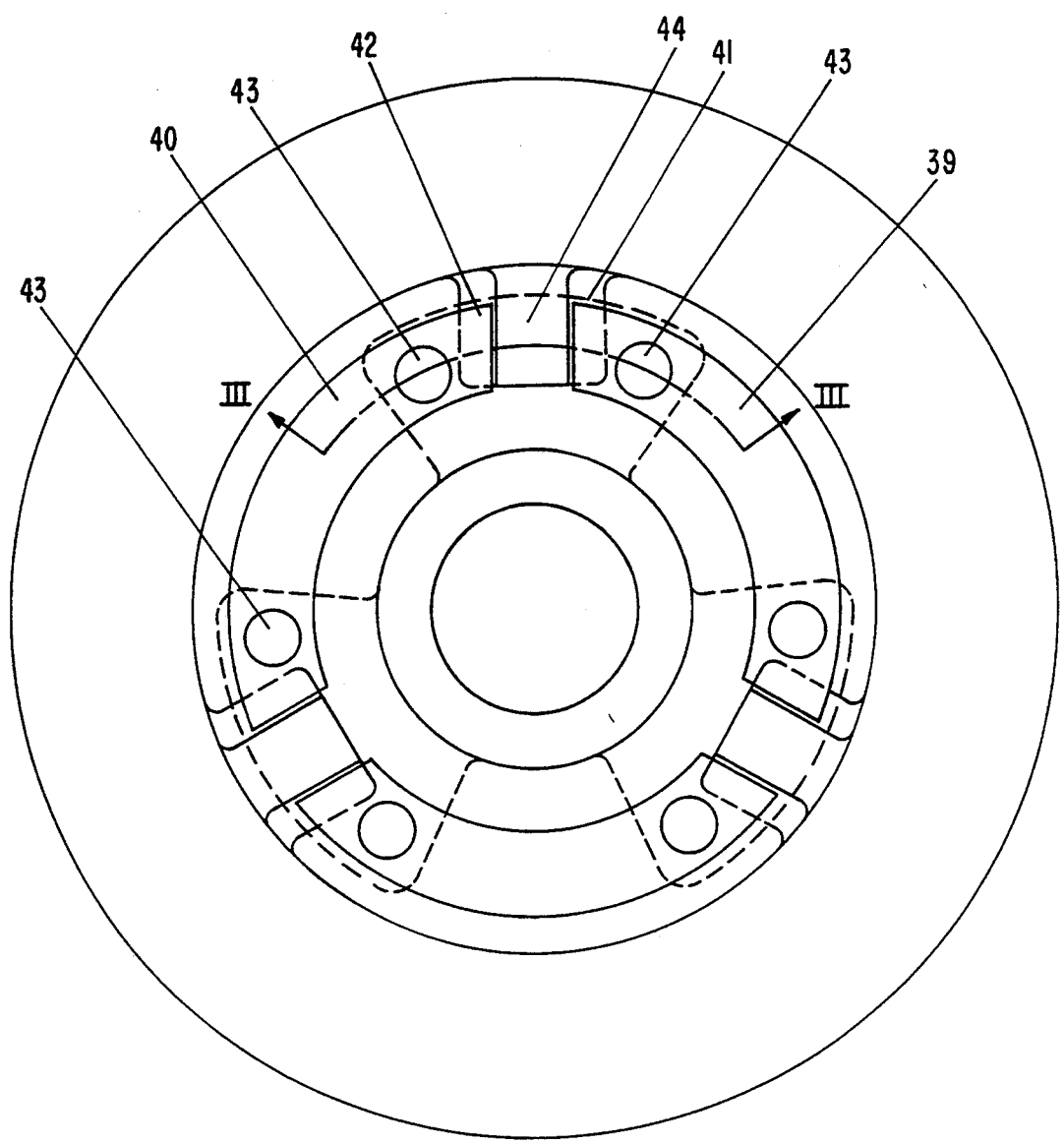
FIG. 4 is a side view of a connection of a brake ring and hub according to FIG. 3.

The embodiment according to FIGS. 3 and 4 is comprised of a dog 35 which has a flat bottom portion 36 resting at the hub 37 and a trapeze-shaped top portion 45. With this embodiment it is possible to provide the dog 35 as an integral part of the brake ring. Furthermore, concentric annular segments 39, 40 are provided whereby the free ends of the segments have slanted faces 41, 42 corresponding to the slanted sides 38 (outer contact surfaces) of the trapeze-shaped top portion 45 of the dog 35. Neighboring ones of the concentric annular segments form between them the groove 44 and the slanted faces 41, 42 form the respective mating inner wall surfaces of the groove 44. Each segment thus contacts two dogs 35. The segments are connected to the hub 37 with screws 43 which extend essentially in the axial direction of the brake disc.

In this embodiment as in all other embodiments of the present invention, the number of the dogs may be selected as desired and thereby conformed to respective design requirements. The advantage of the last mentioned embodiment is that when only one segment is provided at the wheel the function of the brake disc is reduced to some extent but is never completely lost.

The present invention is, of course, in no way restricted to the specific disclosure of the specification and drawings, but also encompasses any modifications within the scope of the appended claims.

What we claim is:

1. An assembled brake disc for a disc brake with partial lining, said brake disc comprising two components in the form of a brake ring and a hub and at least one dog and at least one corresponding groove provided at least at one of said components, said components being connected to one another by said dog extending into said groove, said dog having outer contact surfaces resting at mating inner side walls of said groove, with at least one of said outer contact surfaces and a corresponding one of said mating inner side walls being slanted relative to an axial direction of said brake disc, and further comprising screws extending parallel to said axial direction for pressing said outer contact surfaces against said mating inner side walls, wherein said dog is comprised of a main body and an additional wedge-shaped part, said additional wedge-shaped part having said slanted outer contact surface, and said brake disc further comprising a pressure spring for pressing said additional wedge-shaped part between said main body and said mating inner side walls of said groove.

2. A brake disc according to claim 1, wherein said hub has radially extending arms and said groove is in the form of a recess provided between said arms, with said mating inner side walls being slanted, and with said arms being connected to said brake ring with said screws.

3. A brake disc according to claim 2, wherein said brake ring, at a back side thereof, has projections forming therebetween a recessed portion for receiving said dog, said dog resting in said recess of said arms and in said recessed portion between said projections.

4. An assembled brake disc for a disc brake width partial lining, said brake disc comprising two components in the form of a brake ring and a hub and at least one dog and at least one corresponding groove provided at least at one of said components, said components being connected to one another by said dog extending into said groove, said dog having outer contact surfaces resting at mating inner side walls of said groove, with at least one of said outer contact surfaces and a corresponding one of said mating inner side walls being slanted relative to an axial direction of said brake disc, further comprising screws extending parallel to said axial direction for pressing said outer contact surfaces against said mating inner side walls, and further comprising concentric annular segments, with said groove being formed between adjacent ones of said segments, said segments having at free ends thereof slanted faces forming said mating inner wall surfaces of said groove, with said dog having a flat bottom portion resting on said hub and a trapeze-shaped top portion, with slanted sides of said trapeze-shaped top portion forming said outer contact surfaces and resting at said slanted faces of said segments.

* * * * *